United States Patent
Hajduczenia

(10) Patent No.: US 11,979,331 B2
(45) Date of Patent: May 7, 2024

(54) SELECTION OF A MEMBER LINK OF A LINK AGGREGATION GROUP BASED ON A DATAGRAM SIGNATURE

(71) Applicant: Charter Communications Operating, LLC, St. Louis, MO (US)

(72) Inventor: Marek Hajduczenia, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/901,174

(22) Filed: Sep. 1, 2022

(65) Prior Publication Data

US 2024/0080273 A1 Mar. 7, 2024

(51) Int. Cl.
*H04L 47/41* (2022.01)
*H04L 47/19* (2022.01)
*H04L 47/2416* (2022.01)

(52) U.S. Cl.
CPC .............. *H04L 47/41* (2013.01); *H04L 47/19* (2013.01); *H04L 47/2416* (2013.01)

(58) Field of Classification Search
None
See application file for complete search history.

(56) References Cited

U.S. PATENT DOCUMENTS

| | | | | |
|---|---|---|---|---|
| 9,237,132 | B2 * | 1/2016 | Mihelich | H04L 67/1004 |
| 2006/0126659 | A1 * | 6/2006 | Baum | H04L 12/4633 |
| | | | | 370/466 |
| 2009/0168776 | A1 * | 7/2009 | Baum | H04L 12/4641 |
| | | | | 370/390 |
| 2012/0257631 | A1 * | 10/2012 | Nguyen | H04L 45/18 |
| | | | | 370/400 |

FOREIGN PATENT DOCUMENTS

CN 110505033 A * 11/2019 ............ H04J 3/0667

OTHER PUBLICATIONS

Binsahaq et al., "A Survey on Autonomic Provisioning and Management of QoS in SDN Networks", Jan. 1, 2019, IEEE, IEEE Access (vol. 7, pp. 73384-73435) (Year: 2019).*

* cited by examiner

*Primary Examiner* — Davoud A Zand
(74) *Attorney, Agent, or Firm* — Dority & Manning, P.A.

(57) ABSTRACT

A first network device implementing a link aggregation group with a second network device, receives a first datagram. The link aggregation group has a plurality of member links coupled to both the first network device and the second network device. The first datagram originates from a first device and is destined for a second device that is communicatively coupled to the second network device. The first network device determines that the first datagram matches a first datagram signature. The first network device determines that datagrams that match the first datagram signature are to be sent to the second network device via a first member link of the plurality of member links. The first network device sends, to the second network device, the datagram via the first member link.

20 Claims, 6 Drawing Sheets

SELECTION OF A MEMBER LINK OF A LINK AGGREGATION GROUP BASED ON A DATAGRAM SIGNATURE

BACKGROUND

Multiple links that connect two network devices, such as two switches or routers, may be combined to form a link aggregation group. A link aggregation group may be used, for example, for redundancy and/or capacity increase reasons.

SUMMARY

The embodiments disclosed herein implement selection of a member link of a link aggregation group based on a datagram signature.

In one example a method is provided. The method includes receiving, by a first network device implementing a link aggregation group with a second network device, a first datagram, wherein the link aggregation group comprises a plurality of member links coupled to both the first network device and the second network device, the first datagram originating from a first device and destined for a second device that is communicatively coupled to the second network device. The method further includes determining, by the first network device, that the first datagram matches a first datagram signature. The method further includes determining, by the first network device, that datagrams that match the first datagram signature are to be sent to the second network device via a first member link of the plurality of member links. The method further includes sending, by the first network device to the second network device, the datagram via the first member link.

In another example a network device is provided. The network device includes a memory, and a processor device coupled to the memory. The processor device is configured to implement a link aggregation group with a second network device, wherein the link aggregation group comprises a plurality of member links coupled to both the first network device and the second network device. The processor device is further configured to receive a first datagram originating from a first device and destined for a second device that is communicatively coupled to the second network device. The processor device is further configured to determine that the first datagram matches a first datagram signature. The processor device is further configured to determine that datagrams that match the first datagram signature are to be sent to the second network device via a first member link of the plurality of member links. The processor device is further configured to send, to the second network device, the datagram via the first member link.

In another example a non-transitory computer-readable storage medium is provided. The non-transitory computer-readable storage medium includes executable instructions to cause a processor device of a first network device to implement a link aggregation group with a second network device, wherein the link aggregation group comprises a plurality of member links coupled to both the first network device and the second network device. The executable instructions further cause the processor device to receive a first datagram originating from a first device and destined for a second device that is communicatively coupled to the second network device. The executable instructions further cause the processor device to determine that the first datagram matches a first datagram signature. The executable instructions further cause the processor device to determine that datagrams that match the first datagram signature are to be sent to the second network device via a first member link of the plurality of member links. The executable instructions further cause the processor device to send, to the second network device, the datagram via the first member link.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
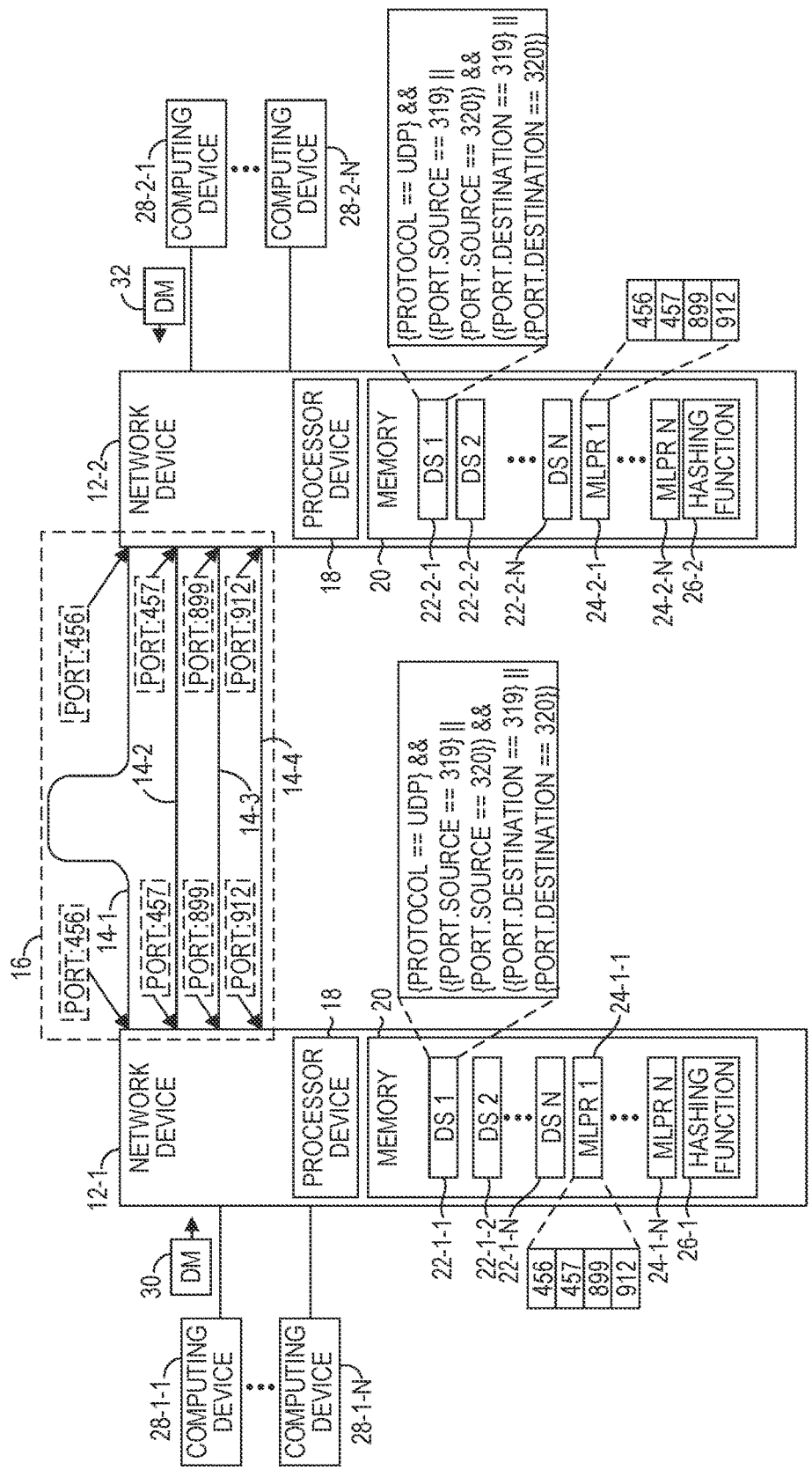
FIG. 1 is a block diagram of an environment in which selection of a member link of a link aggregation group based on a datagram signature can be practiced according to one embodiment.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Multiple links that connect two network devices, such as two switches or routers, may be combined to form a link aggregation group. A link aggregation group may be used, for example, for redundancy and capacity reasons. A link aggregation group is sometimes referred to as a port-channel, a bond, or a team. The individual links of a link aggregation group are sometimes referred to as member links. Member links may be the same media type or mixed media types, such as, by way of non-limiting example, fiber media, wired (e.g., copper) media, radio channel media, point-to-point wireless media, and the like.

A network device may load balance packets among the member links based on an algorithm, such as a hashing algorithm, so that the member links relatively evenly share the load. The hashing algorithm may utilize certain fields in the traffic, such as source and destination MAC addresses, source and destination IP addresses, or the like to derive a particular member link over which to communicate the datagram. Typically, all packets of a specific flow between two network devices will, for a given direction of traffic, use the same member link so that packets are not received out of order. However, the packets of a specific flow may use different links in each direction. For example, all packets of a flow X from network device A to network device B may use member link 1, while all packets of the same flow X from network device B to network device A may use member link 2.

The physical media, such as the physical fiber cable or physical wired cable, that implements the member links may be of different lengths. This may occur because the physical media may have been installed at different times, and the same path used to install an initial member link may not be available at a future point in time for the installation of another member link. This physical length asymmetry may be problematic for latency-symmetry-sensitive applications, such as, by way of non-limiting example, Precision Timing Protocol (PTP).

Within a network data center, a network device may be connected to individual devices via patch cables that connect at a patch panel. Patch cables can have different lengths, also resulting in asymmetric path lengths.

The embodiments disclosed herein implement selection of a member link of a link aggregation group based on a datagram signature. In particular, in one embodiment, two network devices that utilize a link aggregation group each have one or more datagram signatures. The datagram signatures may, for example, identify one or more fields of a datagram, and identify corresponding values for the fields. The two network devices also have corresponding member link prioritization information for each datagram signature. The member link prioritization information identifies one or more member links over which all datagrams that match a corresponding datagram signature are to be sent. The datagram signature and member link prioritization information together ensure that certain datagrams are sent on the same member link in both directions and thus eliminate problems that may otherwise arise with latency-symmetry-sensitive applications traversing different member links that have different physical lengths.

FIG. 1 is a block diagram of an environment 10 in which selection of a member link of a link aggregation group based on a datagram signature can be practiced according to one embodiment. The environment 10 includes a network device 12-1 and a network device 12-2 (generally, network devices 12). The network devices 12 may comprise, for example, layer 2 switches, layer 3 routers, layer 2.5 MPLS switches, layer 7 firewalls, or the like. Each network device 12 may each comprise a single network device, or may comprise a plurality of network devices that operate as a single network device. A plurality of physical media, such as fiber cable and/or wired cable, referred to herein as member links 14-1-14-4 (generally, member links 14), extend between and are coupled to the network devices 12-1 and 12-2. In this example, the member link 14-1 is connected to a port 456 of the network device 12-1 and a port 456 of the network device 12-2; the member link 14-2 is connected to a port 457 of the network device 12-1 and a port 457 of the network device 12-2; the member link 14-3 is connected to a port 899 of the network device 12-1 and a port 899 of the network device 12-2; and the member link 14-4 is connected to a port 912 of the network device 12-1 and a port 912 of the network device 12-2. Note that the port numbers are illustrated as being identical on the network devices 12-1 and 12-2 solely for purposes of illustration and simplicity, and in practice the port numbers on the network devices 12-1 and 12-2 would likely be different. However, each network device 12 maintains information that identifies, for each respective port of the network device 12, the port identifier of the other network device 12 to which the respective port is connected. While only four ports are illustrated for purposes of simplicity, the network devices 12-1 and 12-2 may form a link aggregation group between any number of ports, such as 10 ports, 100 ports, or the like. Moreover, while the same The network devices 12 have formed a link aggregation group 16 that include and utilize the member links 14 to communicate datagrams between the network devices 12. The member links 14 may be different lengths and/or different types of media, such as fiber media or wired media. For example, the member link 14-1 has a greater length than the member links 14-2-14-4. All of the member links 14 have a same data transfer rate, such as 1 Gbps, 10 Gbps, or the like. The term "datagram" as used herein refers to the particular transmission unit relevant to the type of device of the network devices 12. For example, if the network devices 12 are layer 2 devices, such as layer 2 switches, each datagram may be a layer 2 Ethernet frame. If the network devices 12 are layer 3 devices, each datagram may be a layer 3 IP packet.

The network devices 12 include processor devices 18 that are coupled to memories 20. The network device 12-1 includes a plurality of datagram signatures (DSs) 22-1-1-22-1-N. Each of the datagram signatures 22-1-1-22-1-N identifies one or more fields of a datagram and corresponding values of the fields. If the values of the same fields of a datagram match the values in a datagram signature 22-1-1-22-1-N, the datagram matches the datagram signature. As an example, the datagram signature 22-1-1 is matched by any datagram that utilizes the UDP protocol and the port source is either port 319 or port 320 and the destination port is either 319 or port 320.

The network device 12-1 also includes a plurality of member link prioritization records 24-1-1-24-1-N. Each of the member link prioritization records 24-1-1-24-1-N corresponds to one of the datagram signatures 22-1-1-22-1-N. In this example, the member link prioritization record 24-1-1 corresponds to the datagram signature 22-1-1, and the member link prioritization record 24-1-N corresponds to the datagram signature 22-1-N. Each of the member link prioritization records 24-1-1-24-1-N identifies a priority of member links 14 over which datagrams that match the corresponding datagram signature 22-1-1-22-1-N are to be sent. As an example, the member link prioritization record 24-1-1 indicates that datagrams that match the datagram signature 22-1-1 should use port 456. If port 456 is down, then port 457 should be used, followed by ports 899 and 912. The network device 12-1 also includes a hashing function 26-1 that the network device 12-1 uses to identify a particular member link 14 for datagrams that do not match any datagram signature 22-1-1-22-1-N. The hashing function 26-1 utilizes a hashing algorithm and the values of certain fields of a datagram that remain the same for a given flow to derive a particular member link 14 of the plurality of member links 14 over which the datagram should be communicated to the network device 12-2. As an example, the hashing function 26-1 may use the values contained in the source or destination fields of a datagram.

The network device 12-2, which implements the link aggregation group 16 with the network device 12-1, is configured substantially similarly to the network device 12-1. The network device 12-2 includes a plurality of datagram signatures 22-2-1-22-2-N which are substantially similar to, or identical to, the datagram signatures 22-1-1-22-1-N. The network device 12-2 also includes a plurality of member link prioritization records 24-2-1-24-2-N, which correspond to the datagram signatures 22-1-1-22-1-N, and which are substantially similar to, or identical to, the member link prioritization records 24-1-1-24-1-N. The network device 12-2 also includes a hasher 26-2 that the network device 12-2 uses to identify a particular member link 14 for datagrams that do not match any datagram signature 22-2-1-22-2-N. The hasher 26-2 may use the same hashing algorithm as the hashing function 26-1, or a different hashing algorithm.

The network device 12-1 is directly or indirectly communicatively coupled to a plurality of computing devices 28-1-1-28-1-N. The network device 12-2 is directly or indirectly communicatively coupled to a plurality of computing devices 28-2-1-28-2-N. As an example of selection of a member link 14 of the link aggregation group 16 based on a datagram signature assume that the computing device 28-1-1 generates a datagram 30 that identifies the computing device 28-2-1 as the destination device. The computing device 28-1-1 transmits the datagram 30. The network device 12-1 receives the datagram 30. The network device 12-1 accesses the datagram signature 22-1-1 and determines that the datagram 30 matches the datagram signature 22-1-1. In particular, the network device 12-1 determines that values of fields in the datagram 30 match values identified in the datagram signature 22-1-1.

As an example, the datagram signature 22-1-1 identifies four fields of a datagram, a traffic identifier field (i.e., protocol field), a port identifier field (i.e., a port.source field) and a second port identifier field (i.e., a port.destination field). Note that the fields identified in a datagram signature are typically not part of the payload of the datagram, but are header fields that are present in each datagram. The network device 12-1 accesses the datagram signature 22-1-1 to extract from the datagram signature 22-1-1 a plurality of identifiers of a corresponding plurality of fields of a datagram and corresponding values for the plurality of fields. In this example, the network device 12-1 extracts the protocol field identifier and the value "UDP, the port.source field identifier and the values of "319" or "320", and the port.destination field identifier and the values of "319" or "320". The network device 12-1 extracts values from the plurality of fields of the datagram 30. In particular, the network device 12-1 extracts the value contained in the protocol field identifier of the datagram 30, the value contained in the port.source field and the value contained in the destination.source field. The network device 12-1, in this example, determines that the values extracted from the datagram 30 match the values identified in the datagram signature 22-1-1, and thus, that the datagram 30 matches the datagram signature 22-1-1.

If the datagram 30 did not match the datagram signature 22-1-1, the network device 12-1 repeats the process with each of the remaining datagram signatures 22-1-2-28-1-N. If the datagram 30 does not match any of the datagram signatures 22-1-1-28-1-N, the network device 12-1 uses the hashing function 26-1 to derive a particular member link 14 to send the datagram 30 to the network device 12-2.

In this example the datagram 30 matches the datagram signature 22-1-1, and the network device 12-1 determines that datagrams that match the datagram signature 22-1-1 are to be sent to the network device 12-2 via the member link 14-1. In particular, the network device 12-1 accesses the member link prioritization record 24-1-1 that corresponds to the datagram signature 22-1-1. The member link prioritization record 24-1-1 contains member link prioritization information for the datagram signature 22-1-1. The member link prioritization information indicates a priority of ports over which datagrams that match the datagram signature 22-1-1 are to be sent. In this example, the member link prioritization information indicates port 456 (i.e., the member link 14-1) is to be used first if the port 456 is operable. If the port 456 is not operable, the port 457 (i.e., the member link 14-2) is to be used, followed, in order, by the port 899 (i.e., the member link 14-3) and the port 912 (i.e., the member link 14-4).

The network device 12-1 determines that the port 456 is operable, and then sends the datagram 30 to the network device 12-2 via the member link 14-1. The network device 12-2 receives the datagram 30 and delivers the datagram 30 to the computing device 28-2-1.

Subsequently, the computing device 28-2-1 generates a datagram 32 that identifies the computing device 28-1-1 as the destination device. The computing device 28-1-1 transmits the datagram 32. The network device 12-2 receives the datagram 32. The network device 12-2 accesses the datagram signature 22-2-1 and determines that the datagram 32 matches the datagram signature 22-2-1. In particular, the network device 12-2 determines that values of fields in the datagram 32 match values identified in the datagram signature 22-2-1. The network device 12-2 determines that datagrams that match the datagram signature 22-2-1 are to be sent to the network device 12-1 via the member link 14-1. In particular, the network device 12-2 accesses the member link prioritization record 24-2-1 that corresponds to the datagram signature 22-2-1. The member link prioritization record 24-2-1 contains member link prioritization information for the datagram signature 22-2-1. The member link prioritization information indicates a priority of ports over which datagrams that match the datagram signature 22-2-1 are to be sent. In this example, the member link prioritization information indicates port 456 (i.e., the member link 14-1) is to be used first if the port 456 is operable. If the port 456 is not operable, the port 457 (i.e., the member link 14-2) is to be used, followed, in order, by the port 899 (i.e., the member link 14-3) and the port 912 (i.e., the member link 14-4).

The network device 12-2 determines that the port 456 is operable, and then sends the datagram 32 to the network device 12-1 via the member link 14-1. The network device 12-1 receives the datagram 32 and delivers the datagram 32 to the computing device 28-1-1. In this manner, it is assured that datagrams that are part of a same flow are communicated, in both directions, over a same member link 14.

Figure 2:
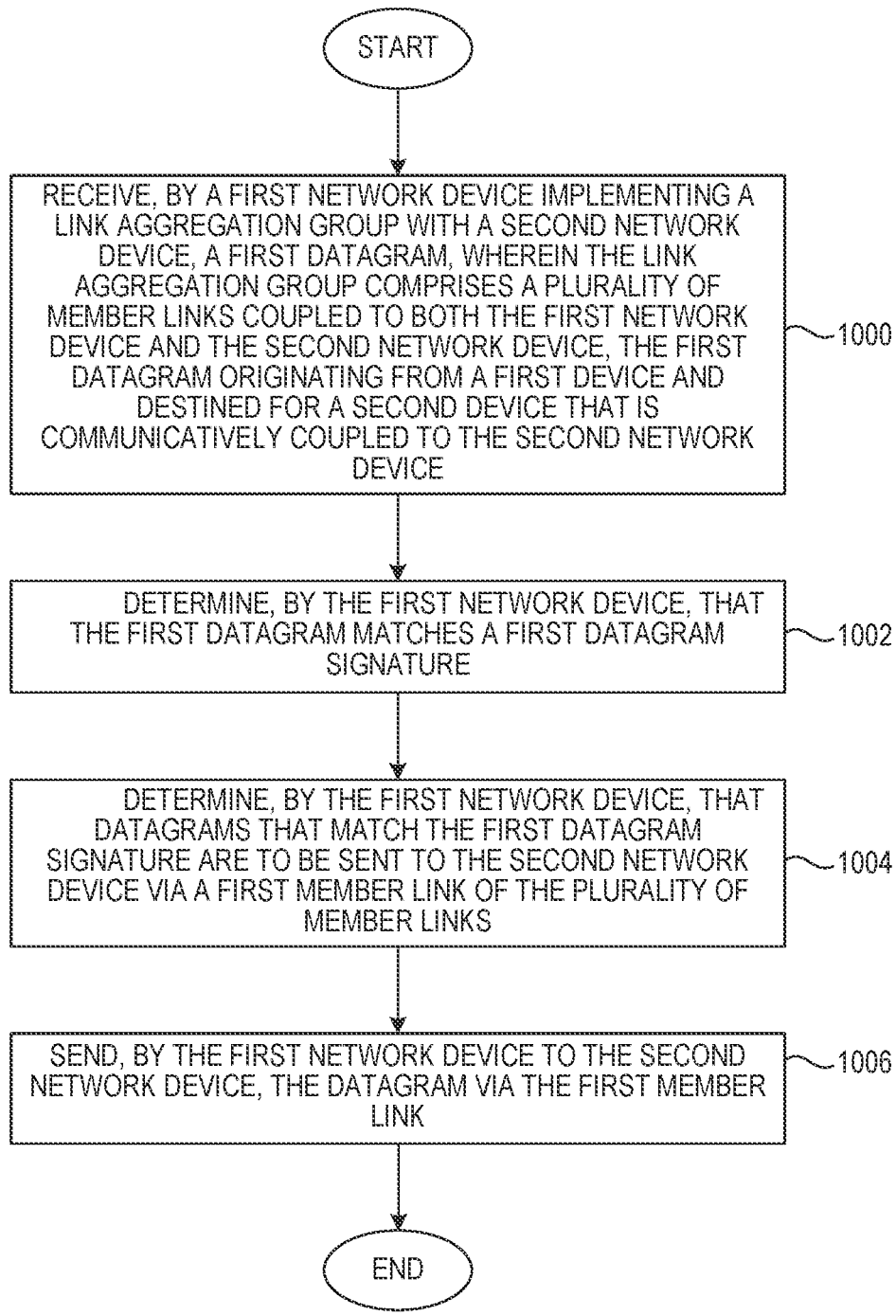
FIG. 2 is a flowchart of a method for selection of a member link of a link aggregation group based on a datagram signature according to one embodiment.

FIG. 2 is a flowchart of a method for selection of a member link 14 of the link aggregation group 16 based on a datagram signature 22 according to one embodiment. FIG. 2 will be discussed in conjunction with FIG. 1. The network device 12-1, which implements the link aggregation group 16 with the network device 12-2, receives the datagram 30. The link aggregation group 16 comprises the plurality of member links 14 coupled to both the network device 12-1 and the network device 12-2. The datagram 30 originates from the computing device 28-1-1 and is destined for the computing device 28-2-1 that is communicatively coupled to the network device 12-2 (FIG. 2, block 1000). The network device 12-1 determines that the datagram 30 matches the datagram signature 22-1-1 (FIG. 2, block 1002). The network device 12-1 determines that datagrams that match the datagram signature 22-1-1 are to be sent to the network device 12-2 via the member link 14-1 of the plurality of member links 14 (FIG. 2, block 1004). The network device 12-1 sends, to the network device 12-2, the datagram 30 via the member link 14-1 (FIG. 2, block 1006).

Figure 3:
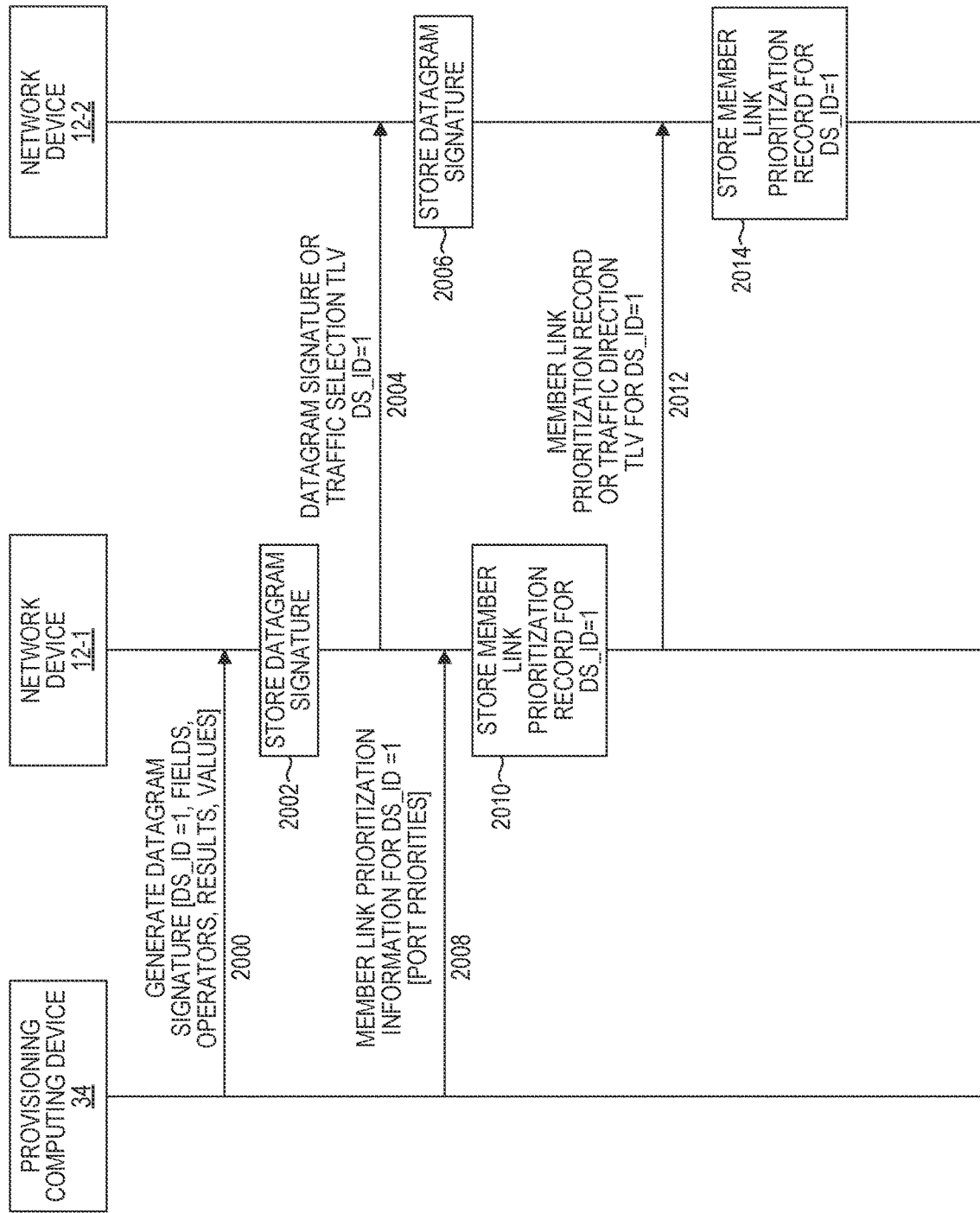
FIG. 3 is a message sequence diagram illustrating example messages between and actions taken by various components for generating a datagram signature and a member link prioritization record according to one embodiment.

FIG. 3 is a message sequence diagram illustrating example messages between and actions taken by various components for generating a datagram signature and a member link prioritization record according to one embodiment. In this example, an operator interacts with a provisioning computing device 34 to indicate that a new datagram signature associated with the link aggregation group 16 is to be created and used by the network devices 12-1-12-2. In some implementations, the provisioning computing device 34 may present a user interface to the operator that allows the operator to select any desired non-payload fields of a datagram, corresponding values of such fields, and a list of operators such as AND, OR, and the like, to define the desired datagram signature.

By way of non-limiting example, the operator, for a layer 2 datagram, may be able to select any of the following datagram fields:

Layer 2 fields:
0x01: Ethernet MAC DA field
0x02: Ethernet MAC SA field
0x03: Ethernet type/length field
0x04: Backbone MAC DA field
0x05: Backbone MAC SA field
0x06: Backbone Service Instance TAG field
0x07: Service VLAN TAG field
0x08: Customer VLAN TAG field
0x15: Backbone TAG field By way of non-limiting example, the operator, for a layer 2.5 datagram, may in addition to the layer 2 fields be able to select the following datagram field:
0x09: MPLS LSE field.

By way of non-limiting example, the operator, for a layer 3 datagram, may in addition to the layer 2 and 2.5 fields be able to select any the following datagram fields:

Layer 3 fields:
0x0A: IP ToS/TC field
0x0B: IP Time to Live/Hop Limit field
0x0C: IP Protocol Type field
0x0D: IPv4 DA field
0x0E: IPv6 DA field
0x0F: IPv4 SA field
0x10: IPv6 SA field
0x11: IPv6 NEXT HEADER field
0x12: IPv6 FLOWLABEL field By way of non-limiting example, the operator, for a layer 4 datagram, may in addition to the layers 2, 2.5 and 3 fields be able to select any the following datagram fields:

Layer 4 fields:
0x13: TCP/UDP Source Port field
0x14: TCP/UDP Destination Port field By way of non-limiting example, the operator may indicate for any of the selected fields or combination of fields, an operator of:
0x01: Logical AND
0x02: Logical OR
0x03: Logical NOT
0x04: NOP (no operation, end of logical sequence)

By way of non-limiting example, the operator may indicate for any of the selected fields or combination of fields, a result of:
0x01: equal
0x02: not equal
0x03: less than
0x04: more than
0x05: less than or equal
0x06: more than or equal
0x07: never (condition never matches)
0x08: always (condition always matches)

The provisioning computing device 34 sends a request containing the desired fields, values, operators and results to the network device 12-1. The information may include a datagram signature identifier that uniquely identifies the datagram signature 22 (FIG. 3, block 2000). The network device 12-1 receives the information that identifies the datagram signature 22 and generates and stores a datagram signature 22 based on the information received from the provisioning computing device 34 (FIG. 3, block 2002). The network device 12-1 sends the datagram signature 22, or the information received from the provisioning computing device 34, to the network device 12-2 (FIG. 3, block 2004).

In some embodiments, the network devices 12 may modify a standardized protocol, such as IEEE Std 802.1AB Link Layer Discovery Protocol (LLDP), to communicate certain information. LLDP is commonly used for network topology discovery, network troubleshooting and automation of network management.

LLPD is a one-way protocol with periodic retransmissions out each physical and logical port configured for LLDP operation. The LLDP messages (LLDPDU) are transmitted every 30 seconds with default settings, but can be transmitted much more frequently or even on demand, as needed. LLDPDUs are sent to a Layer-2 BPDU address and are not forwarded by bridges, making LLDP a link-local protocol only. Individual LLDPDUs comprise a number of Type Length Value (TLV) messages, including:

mandatory Chassis-ID and Port-ID TLVs to identify stations mandatory Time-to-live information for aging purposes mandatory End-of-PDU TLV to consistently mark the end of processing optional additional device describing TLVs such as the management address and system name optional includes Organizationally Specific TLVs (defined by the organizations themselves, e.g., IEEE 802.1, IEEE 802.3, TIA, etc.).

The generic format of an LLDPDU frame is shown below

| DA | SA | Ethertype | ←Data + pad→ | | |
|---|---|---|---|---|---|
| LLDP_Multicast address | Source MAC address | BB-CC | LLDPDU | | FCS |
| 6 | 6 | 2 | 1500 | | 4 Octets |

The data portion is comprised of multiple TLVs, as shown below and reproduced from IEEE Std 802.1AB.

FIG. 8-1-LLDPDU format

| Octets: | 1 | | | | | N |
|---|---|---|---|---|---|---|
| | Chassis ID TLV M | Port ID TLV M | Time To Live TLV M | Optional TLV | ... Optional TLV | End Of LLDPDU TLV |

M—mandatory
TLV—required for all LLDPDUs

Existing standard TLVs used in LLDP are shown below and reproduced from IEEE Std 802.1AB.

TABLE 8-1

TLV type values

| TLV type [a] | TLV name | Usage in LLDPDU | Reference |
|---|---|---|---|
| 0 | End Of LLDPDU | Optional | 8.5.1 |
| 1 | Chassis ID | Mandatory | 8.5.2 |
| 2 | Port ID | Mandatory | 8.5.3 |
| 3 | Time To Live | Mandatory | 8.5.4 |
| 4 | Port Description | Optional | 8.5.5 |
| 5 | System Name | Optional | 8.5.6 |
| 6 | System Description | Optional | 8.5.7 |
| 7 | System Capabilities | Optional | 8.5.8 |
| 8 | Management Address | Optional | 8.5.9 |
| 9-126 | Reserved for future standardization | — | — |
| 127 | Organizationally Specific TLVs | Optional | — |

[a] TLVs with type values 0-8 are members of the basic management set.

The "Port ID" TLV carries the unique port identifier, allowing both link aggregation group (LAG) partner devices, such as the network device 12-1 and the network device 12-2, to create association between the local and remote unique port identifiers. An example below shows a LAG with 4 member links between network devices A and B, with the respective unique port identifiers discovered as part of the LLDPDU exchange between the LAG partners (the term "LAG partners", as used herein, generally refers to two network devices, such as the network devices 12-1 and 12-2, that implement a LAG).

| | Device A | Device B |
|---|---|---|
| member link 1 | 678 | 1232 |
| member link 2 | 511 | 3251 |
| member link 3 | 699 | 1556 |
| member link 4 | 587 | 1565 |

In the example above, the member link 1 interconnects port with ID of 678 on device A with port with ID of 1232 on device B. The port ID is unique for the given device. ID overlap between both LAG partners is possible, but does not matter, since the port ID is relevant in the context of the given device and the LAG instance. The port ID shown above uses numeric (default) representation, though may comprise any format as implemented by the given equipment vendor. Some of the available port ID types are presented in the table below, as defined in IEEE Std 802.1AB-2016.

TABLE 8-3 port ID subtype enumeration

| ID subtype | ID basis | References |
|---|---|---|
| 0 | Reserved | — |
| 1 | Interface alias | ifAlias (IETF RFC 2863) |
| 2 | Port component | entPhysicalAlias when entPhysicalClass has a value 'port(10)' or 'backplane(4)' (IETF RFC 6933) |
| 3 | MAC address | MAC address (IEBEE Std 802) |
| 4 | Network address | networkAddress [a] |
| 5 | Interface name | ifName (IETF RFC 2863) |
| 6 | Agent circuit ID | agent circuit ID (IETF RFC 3046) |
| 7 | Locally assigned | local [b] |
| 8-255 | Reserved | — |

Each LAG partner updates the LAG member link ID table continuously as LLPDUs are exchanged between LAG partners on a periodic basis. Note that LLPDUs are transmitted periodically (for example, every 30 seconds) to keep the information up to date but can be also transmitted on demand to perform a more targeted information refresh, when some change in the relevant state takes place.

The LAG member link ID table is then used to populate the Organizationally Specific TLV used to propagate information about the mapping of specific traffic type, its identification, and selection (order) of the LAG member links on which the given traffic of interest is supposed to be transmitted. The Organizationally Specific TLVs can be defined by any organization in possession of a valid IEEE Organization Unique Identifier (OUI) and are marked with the TLV type of 111 1111 (binary). The resulting structure of the Organizationally Specific TLVs is shown below FIG. 8-12—Basic format for Organizationally Specific TLVs

| Octets: | 1 | 2 | 3 | 6 | 7 | 6 + n |
|---|---|---|---|---|---|---|
| | TLV type = 127 (7 bits) | TLV information string length (9 bits) | organizationally unique identifier (OUI) (3 octets) | | organizationally defined subtype (1 octet) | organizationally defined information string (0 ≤ n ≤ 507 octets) |
| Bits: | 8       2 1 | 8       1 | | | | |
| | ←TLV header→ | | | ←TLV information string→ 4-511 octets | | |

In some embodiments, a new TLV (referred to herein as a "Traffic Selection" TLV) may be used to communicate datagram signatures among the network devices 12-1 and 12-2. The Traffic Selection TLV allows the local LAG partner to announce to the remote LAG partner the configuration of the specific traffic selection rule, effectively communicating the selection criteria and resulting traffic identifier. The structure of this TLV according to one embodiment is shown below:

| Size | Value | Field name | Description |
| --- | --- | --- | --- |
| 7 bits | 127 | TLV type | Defines the TLV type as Organizationally Specific TLV |
| 9 bits | varies | TLV information length | Contain the length of the TLV, starting from the OUI field onwards, expressed in octets |
| 3 octets | varies | OUI | The organizationally unique identifier field contain the organization's OUI |
| 1 octet | 1 | TLV subtype | The TLV subtype (selected to be 1) |
| 2 octets | varies | Traffic Identifier | Unique identifier for the given traffic of interest type |
| 2 octets | varies | Length | The size of the traffic classification rule, starting from the field following the Length field. This value is expressed in units of octets. |
| 2 octets | varies | Stanza length | The size of the classification Repeated stanza, covering the Field, N times Results, Value, and Operator fields |
| 1 octet | varies | Field | See values below for Field |
| 1 octet | varies | Results | See values below for Results |
| Varies | varies | Value | The value to compare the given field to |
| 1 octet | varies | Operator | See values below for Operator |

Traffic Selection TLV

The values of individual Field references may be as follows:
Layer 2 fields:
 0x01: Ethernet MAC DA field
 0x02: Ethernet MAC SA field
 0x03: Ethernet type/length field
 0x04: Backbone MAC DA field
 0x05: Backbone MAC SA field
 0x06: Backbone Service Instance TAG field
 0x07: Service VLAN TAG field
 0x08: Customer VLAN TAG field
 0x15: Backbone TAG field
Layer 2.5 fields:
 0x09: MPLS LSE field
Layer 3 fields:
 0x0A: IP ToS/TC field
 0x0B: IP Time to Live/Hop Limit field
 0x0C: IP Protocol Type field
 0x0D: IPv4 DA field
 0x0E: IPv6 DA field
 0x0F: IPv4 SA field
 0x10: IPv6 SA field
 0x11: IPv6 NEXT HEADER field
 0x12: IPv6 FLOWLABEL field
Layer 4 fields:
 0x13: TCP/UDP Source Port field
 0x14: TCP/UDP Destination Port field
The values of individual Operators may be as follows:
 0x01: Logical AND
 0x02: Logical OR
 0x03: Logical NOT
 0x04: NOP (no operation, end of logical sequence)
The values of individual Results may be as follows:
 0x01: equal
 0x02: not equal
 0x03: less than
 0x04: more than
 0x05: less than or equal
 0x06: more than or equal
 0x07: never (condition never matches)
 0x08: always (condition always matches)

The tuple comprising the Stanza length, Field, Results, Value, and Operator fields is repeated as many times (N) as needed to describe the given traffic type (i.e., datagram signature). For example, to properly identify the Precision Timing Protocol (PTP) traffic, the following rules may be encoded into the Traffic Selection TLV, using an arbitrary (example) Traffic Identifier value of 67:

| Size | Value | Description |
| --- | --- | --- |
| 2 octets | 67 | Traffic Identifier |
| 2 octets | varies | Length |
| 2 octets | 6 | Stanza length of 6 octets |
| 1 octet | 0 × 0C | IP Protocol type |
| 1 octet | 0 × 01 | equal |
| 3 octets | udp | "udp" |
| 1 octet | 0 × 01 | Logical AND |
| 2 octets | 5 | Stanza length of 5 octets |
| 1 octet | 0 × 13 | TCP/UDP source port |
| 1 octet | 0 × 01 | equal |
| 2 octets | 0 × 013F | 319 in hex representation |
| 1 octet | 0 × 02 | Logical OR |
| 2 octets | 5 | Stanza length of 5 octets |
| 1 octet | 0 × 13 | TCP/UDP source port |
| 1 octet | 0 × 01 | equal |
| 2 octets | 0 × 0140 | 320 in hex representation |
| 1 octet | 0 × 01 | Logical AND |
| 2 octets | 5 | Stanza length of 5 octets |
| 1 octet | 0 × 14 | TCP/UDP destination port |
| 1 octet | 0 × 01 | equal |
| 2 octets | 0 × 013F | 319 in hex representation |
| 1 octet | 0 × 02 | Logical OR |
| 2 octets | 5 | Stanza length of 5 octets |
| 1 octet | 0 × 14 | TCP/UDP destination port |
| 1 octet | 0 × 01 | equal |
| 2 octets | 0 × 0140 | 320 in hex representation |
| 1 octet | 0 × 04 | NOP, end of description |

The remote LAG partner (e.g., the network device 12-2) receives the traffic selection rule defined in the Traffic Selection TLV and decodes the traffic selection rule, and a datagram signature is created and associated with the specific Traffic Identifier. The parsing of the given traffic description carried in the Traffic Selection TLV ends with the NOP value in the Operator field. The Traffic Selection TLV may carry more than one traffic selection rule to save on space and minimize overhead. The Traffic Selection TLV may carry only one traffic selection rule to simplify the processing on the receiving end. The decision to support more than one traffic selection rule per Traffic Selection TLV is implementation dependent and does not affect the interoperability between different vendors.

On receiving a Traffic Selection TLV that has a Traffic Identifier that is already associated with an existing datagram signature, the network device 12 may generate a new datagram signature based on the traffic selection rule and overwrite the existing datagram signature with a new datagram signature. The LAG partner may generate a warning/alarm that the existing datagram signature was overwritten.

The LAG partner may not be responsible for scrutinizing the validity of the traffic selection rule datagram for the Traffic Identifier as received from the remote LAG partner as long as they are syntactically correct.

In this example, the network device 12-2 receives the traffic selection TLV that contains the traffic selection rule and generates and stores a datagram signature on the network device 12-2 based on the traffic selection rule (FIG. 3, block 2006).

The operator may interact with the provisioning computing device 34 to cause the provisioning computing device 34 to send member link prioritization information that corresponds to the datagram signature to the network device 12-1 (FIG. 3, block 2008). The member link prioritization information identifies a priority of member links over which datagrams that match the datagram signature are to be sent. The network device 12-1 stores the member link prioritization information in a manner that correlates the member link prioritization information with the datagram signature (FIG. 3, block 2010). The network device 12-1 sends, to the network device 12-2, the member link prioritization information (FIG. 3, block 2012).

In some embodiments, a new TLV (referred to herein as a "Traffic Direction" TLV) may be used to communicate member link prioritization information that corresponds to a particular traffic selection rule (e.g., a datagram signature) among the network devices 12-1 and 12-2. The Traffic Direction TLV allows the local LAG partner to announce to the remote LAG partner the selection of which of the specific LAG member links 14 will be used for transmission of datagrams that match a specific datagram signature. The structure of a Traffic Direction TLV, according to one embodiment, may be as illustrated below:

| Size | Value | Field name | Description | |
|---|---|---|---|---|
| 7 bits | 127 | TLV type | Defines the TLV type as Organizationally Specific TLV | |
| 9 bits | varies | TLV information length | Contain the length of the TLV, starting from the OUI field onwards, expressed in octets | |
| 3 octets | varies | OUI | The organizationally unique identifier field contain the organization's OUI | |
| 1 octet | 2 | TLV subtype | The TLV subtype (selected to be 2) | |
| 2 octets | varies | Traffic Identifier | Unique identifier for the given traffic of interest type | |
| 1 octet | varies | Port ID subtype | See IEEE Std 802.1AB, Table 8-3 | Repeated N times |
| 1 octet | varies | Port ID priority | Port ID priority value in the list of all port ID values, with 0 = highest priority (first selection) and 255 = lowest priority (last selection). | |
| 1 octet | varies | Port ID length | The length of the Port ID value field, expressed the units of octets | |
| Varies | varies | Port ID value | Port ID value, selected as priority N for the given traffic of interest type | |

The Traffic Identifier field contains the unique identifier for the given traffic of interest type, mapped into 2 octets value. The tuple comprising of the Port ID subtype field, Port ID priority field, Port ID length field, and Port ID value is repeated N times, where N is equal to the number of LAG member links to be used for the transmission of the given traffic type. For example, if only two member links are elected for the transmission of the given traffic type, the value of N is 2, and there are two aforementioned tuples in the TLV. The Port ID subtype value identifies the type of the port ID used to identify the given port. See IEEE Std 802.1AB, Table 8-3 for the supported types and values. The Port ID priority value identifies the priority of the given port in the list of all port ID values (N entries), where the value is 0 identifies the highest priority (first selection) and the value of 255 identifies the lowest priority (last selection). Each tuple must be associated with the unique priority for conflict resolution.

The Port ID length value identifies the size of the following Port ID value field, with the value expressed in octets. This field allows the variable-length TLV structure to be properly parsed by the remote LAG partner. The Port ID value identifies the given port on the local LAG partner to be used for the exchange of the given traffic of interest with a specific priority. The value must follow the selection of the Port ID subtype and meet the requirements of the IEEE Std 802.1AB, Table 8-3 for the given selected ID basis. When long Port ID values are selected (for example, ifName, corresponding to the human-readable interface names), the Traffic Direction TLV may hold just one Port ID instance. In this case, a series of Traffic Direction TLVs may need to be sent to the remote LAG partner to communicate the port ordering preference.

The LAG partner may use its local LAG member link ID table to map the Port ID values received from the remote LAG partner into its local Port ID values and populate the Traffic Type Priority Table (e.g., membership link prioritization information for each datagram signature). Each LAG partner may be responsible for keeping the list of the Port ID values for the given traffic type, ordered by priority, and keep it updated with information provided by the remote LAG partner via the Traffic Direction TLV exchange (Traffic Type Priority Table). An example of such a Traffic Type Priority Table is shown below

| Traffic type | Port ID | Priority |
|---|---|---|
| 37 | 456 | 0 |
| | 457 | 1 |
| | 899 | 2 |
| | 912 | 3 |
| 64 | 456 | 0 |
| | 899 | 1 |
| | 912 | 2 |
| | 457 | 3 |

Two traffic types are shown as an example in the above Traffic Type Priority Table: one with unique identifier of 37 and another one with a unique identifier of 64. For the traffic type 37, Port IDs were communicated to be used in the following order: 456, 457, 899, and 912. For the traffic type 64, Port IDs were communicated to be used in the following order: 456, 899, 912, and 457. Note that each traffic type may be configured with a completely different Port ID sequence, depending on the configuration preferences.

In this example, the network device 12-2 receives the Traffic Direction TLV and generates a member link prioritization record based on the Traffic Direction TLV (FIG. 3, block 2014).

Figure 4:
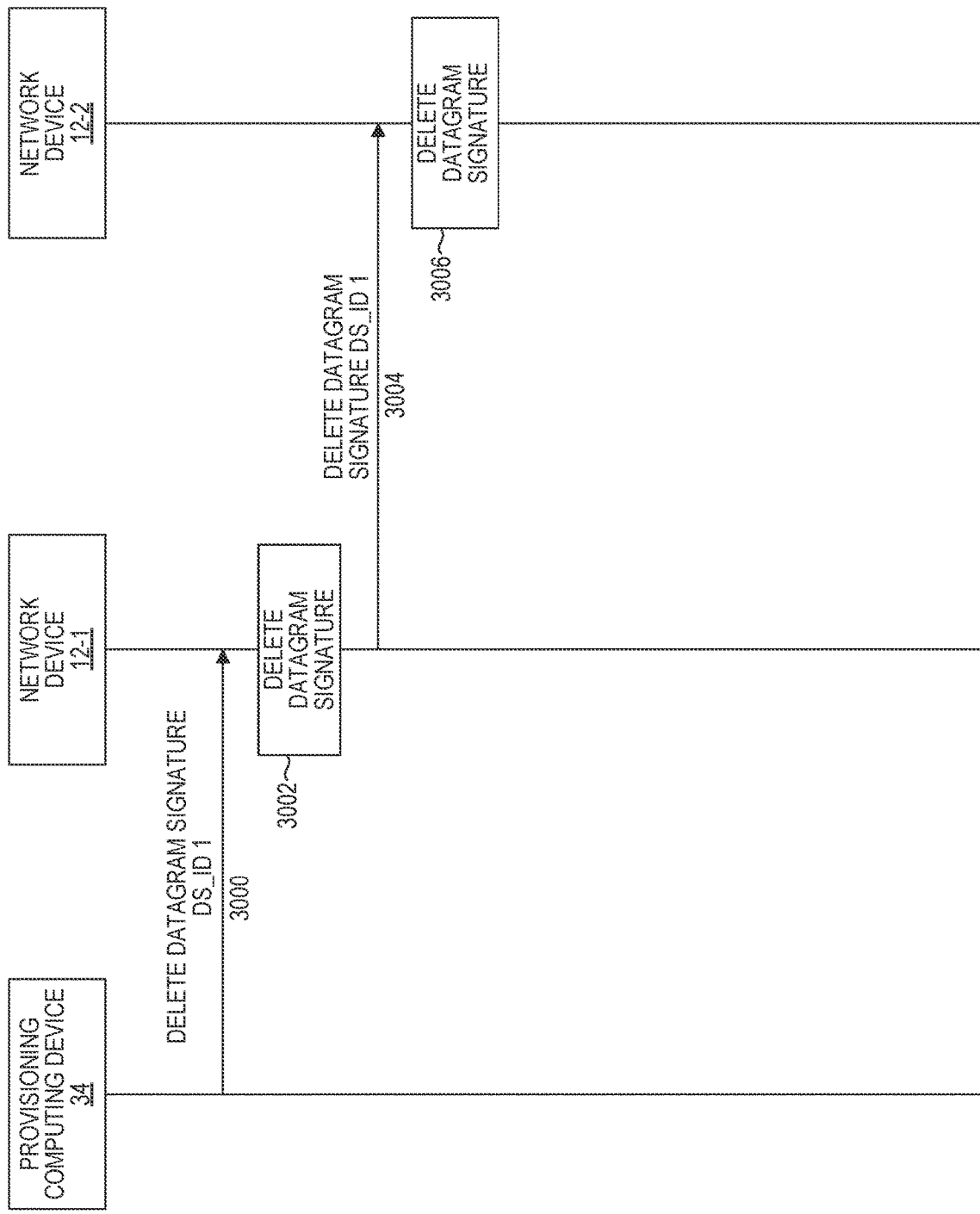
FIG. 4 is a message sequence diagram illustrating example messages between and actions taken by various components for deletion of a datagram signature according to one embodiment.

FIG. 4 is a message sequence diagram illustrating example messages between and actions taken by various components for deletion of a datagram signature according to one embodiment. In this example, the operator interacts with the provisioning computing device 34 to cause the provisioning computing device 34 to send a request to the network device 12-1 to delete an identified datagram signature (FIG. 4, block 3000). The network device 12-1 receives the request, and in response, deletes the identified datagram signature (FIG. 4, block 3002). As an example, referring to FIG. 1, if the request related to the datagram signature 22-1-1, the network device 12-1 removes the datagram signature 22-1-1 from the memory 20. The network device 12-1 sends a request to the network device 12-2 to delete the datagram signature that corresponds to the datagram signature 22-1-1 (FIG. 4, block 3004). The network device 12-2 deletes the datagram signature 22-2-1 (FIG. 4, block 3006).

Figure 5:
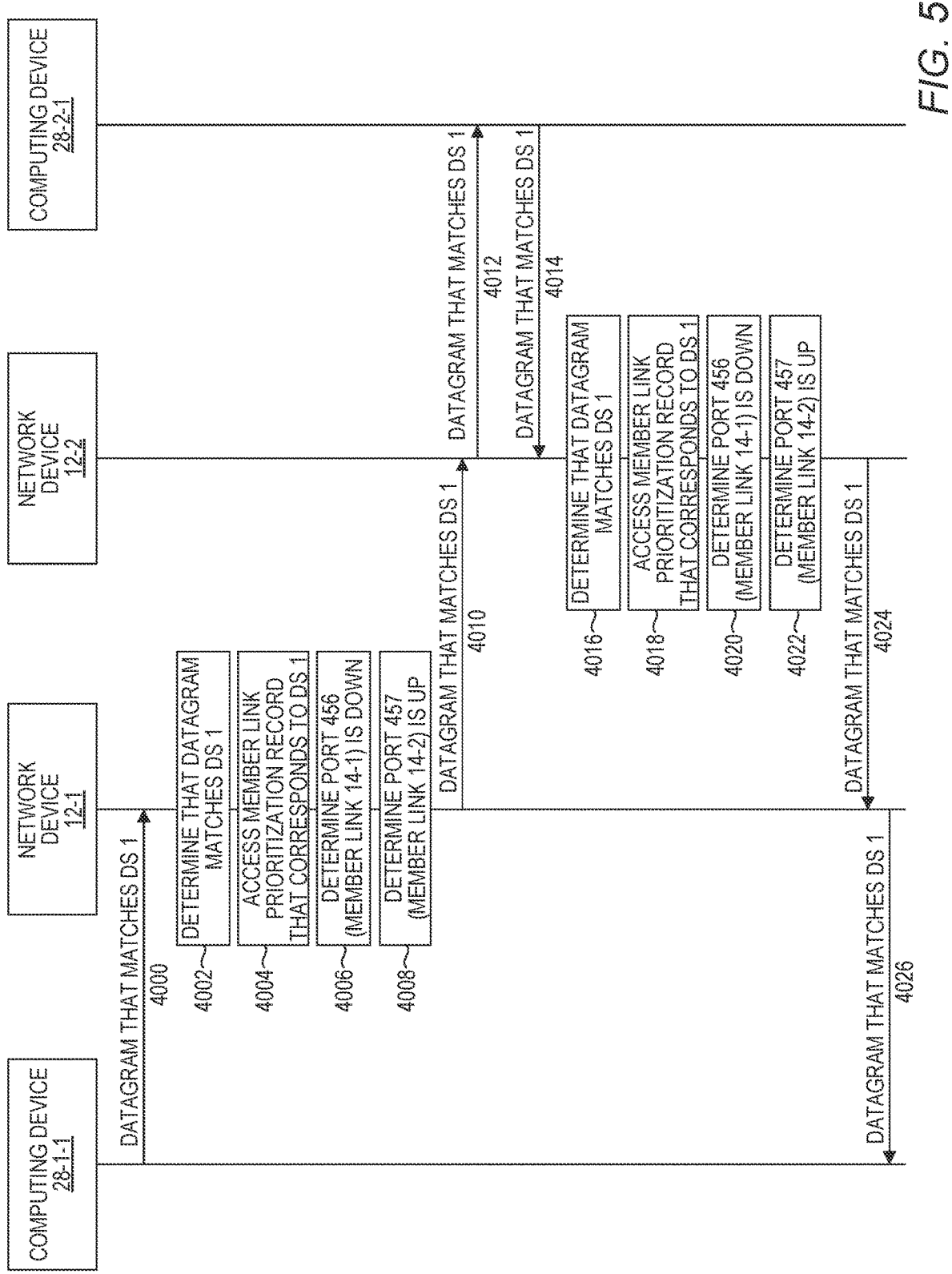
FIG. 5 is a message sequence diagram illustrating example messages between and actions taken by various components when a port becomes inoperable according to one embodiment.

FIG. 5 is a message sequence diagram illustrating example messages between and actions taken by various components when a port becomes inoperable according to one embodiment. In this example the computing device 28-1-1 sends a datagram having a destination address of the computing device 28-2-1 and matching the datagram signature 22-1-1 to the network device 12-1 (FIG. 5, block 4000). The network device 12-1 determines that the datagram matches the datagram signature 22-1-1 (FIG. 5, block 4002). The network device 12-1 accesses the member link prioritization record 24-1-1 that corresponds to the datagram signature 22-1-1 (FIG. 5, block 4004). The network device 12-1 determines that the highest priority port identified by the member link prioritization record 24-1-1 is port 456 (i.e., member link 14-1) but that port 456 is inoperable (FIG. 5, block 4006). The network device 12-1 determines that the next priority port is port 457 (i.e., member link 14-2), and that port 457 is up (FIG. 5, block 4008). The network device 12-1 sends the datagram to the network device 12-2 via the member link 14-2 (FIG. 5, block 4010). The network device 12-2 sends the datagram to the computing device 28-2-1 (FIG. 5, block 4012).

Subsequently, the computing device 28-2-1 sends a datagram having a destination address of the computing device 28-1-1 and matching the datagram signature 22-2-1 to the network device 12-2 (FIG. 5, block 4014). The network device 12-2 determines that the datagram matches the datagram signature 22-2-1 (FIG. 5, block 4016). The network device 12-2 accesses the member link prioritization record 24-2-1 that corresponds to the datagram signature 22-2-1 (FIG. 5, block 4018). The network device 12-2 determines that the highest priority port identified by the member link prioritization record 24-2-1 is port 456 (i.e., member link 14-1) but that port 456 is inoperable (FIG. 5, block 4020). The network device 12-2 determines that the next priority port is port 457 (i.e., member link 14-2), and that port 457 is up (FIG. 5, block 4022). The network device 12-2 sends the datagram to the network device 12-1 via the member link 14-2 (FIG. 5, block 4024). The network device 12-1 sends the datagram to the computing device 28-1-1 (FIG. 5, block 4026).

Figure 6:
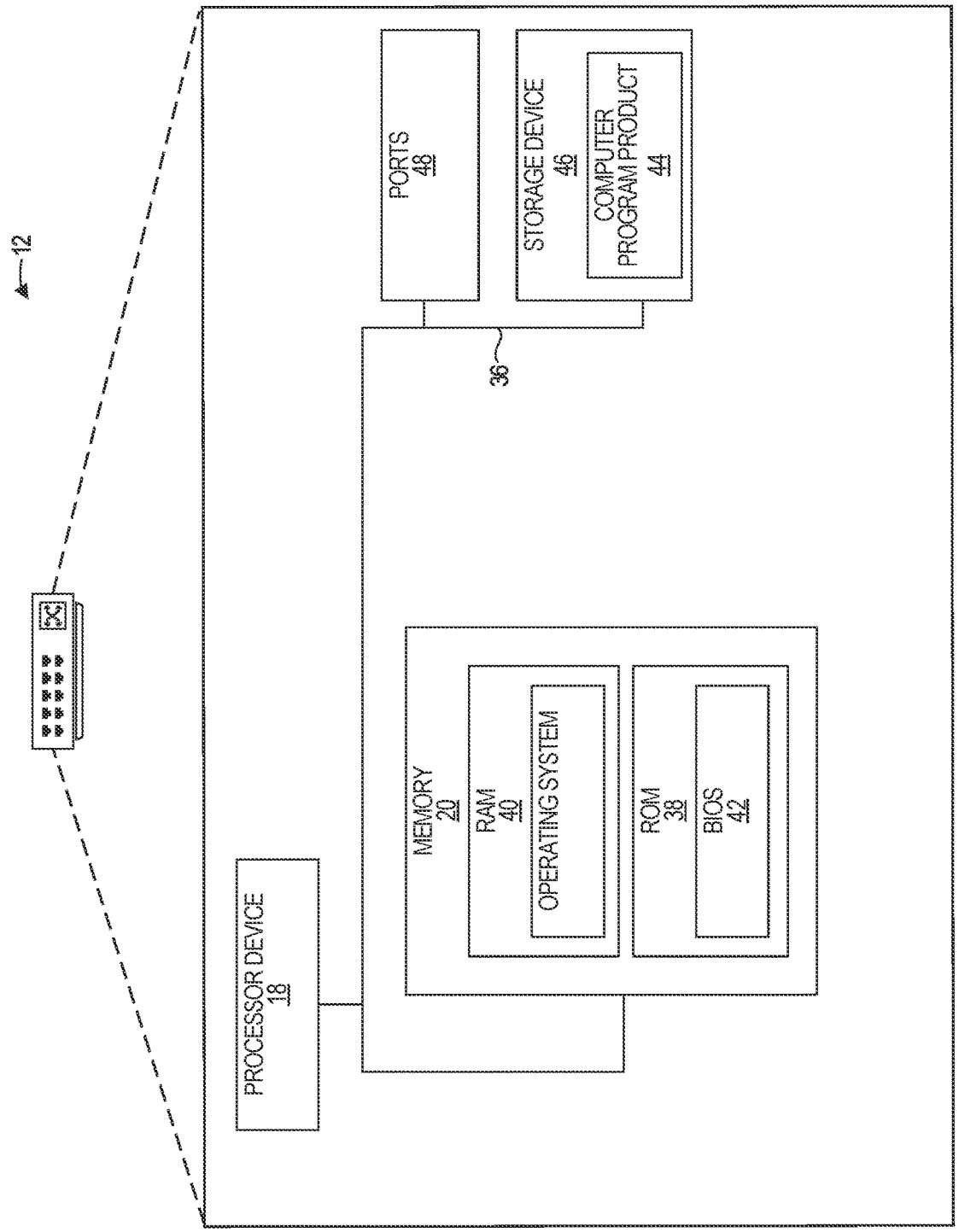
FIG. 6 is a block diagram of a network device suitable for implementing examples according to one example.

FIG. 6 is a block diagram of the network device 12 suitable for implementing embodiments disclosed herein. The network device 12 may comprise any computing or electronic device capable of including firmware, hardware, and/or executing software instructions to implement the functionality described herein, such as a switch, a router, or the like. The network device 12 may include the processor device 18, the memory 20, and a system bus 36. The system bus 36 may provide an interface for system components including, but not limited to, the memory 20 and the processor device 18. The processor device 18 can be any commercially available or proprietary processor.

The memory 20 may include non-volatile memory 38 (e.g., read-only memory (ROM), erasable programmable read-only memory (EPROM), electrically erasable programmable read-only memory (EEPROM), etc.), and volatile memory 40 (e.g., random-access memory (RAM)). A basic input/output system (BIOS) 42 may be stored in the non-volatile memory 38 and can include the basic routines that help to transfer information between elements within the network device 12. The volatile memory 40 may also include a high-speed RAM, such as static RAM, for caching data.

The network device 12 may further include or be coupled to a non-transitory computer-readable storage medium such as the storage device 46, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 46 and other drives associated with computer-readable media and computer-usable media may provide non-volatile storage of data, data structures, computer-executable instructions, and the like.

All or a portion of the examples may be implemented as a computer program product 44 stored on a transitory or non-transitory computer-usable or computer-readable storage medium, such as a storage device 46, which includes complex programming instructions, such as complex computer-readable program code, to cause the processor device 18 to carry out the steps described herein. Thus, the computer-readable program code can comprise software instructions for implementing the functionality of the examples described herein when executed on the processor device 18. The network device 12 also includes one or more ports 48, each of which can implement one or more member links 14.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a first network device implementing a link aggregation group with a second network device, a first datagram, wherein the link aggregation group comprises a plurality of member links coupled to both the first network device and the second network device, each member link comprising a separate communications medium and being connected to a particular physical port of a plurality of physical ports of the first network device and a particular physical port of a plurality of physical ports of the second network device, the first datagram originating from a first device and destined for a second device that is communicatively coupled to the second network device;
determining, by the first network device, that the first datagram matches a first datagram signature;
determining, by the first network device, that datagrams that match the first datagram signature are to be sent to the second network device via a first member link of the plurality of member links; and sending, by the first network device to the second network device, the first datagram via the first member link.

2. The method of claim 1 further comprising:
receiving, by the first network device, a second datagram;
comparing, by the first network device, the second datagram to a plurality of datagram signatures including the first datagram signature;
determining, by the first network device, that the second datagram does not match any datagram signature of the plurality of datagram signatures;
selecting, by the first network device, using a hashing algorithm, a particular member link of the plurality of member links; and
sending, by the first network device to the second network device, the second datagram via the particular member link.

3. The method of claim 1 further comprising:
receiving, by the second network device from the second device, a second datagram, the second datagram destined for the first device;
determining, by the second network device, that the second datagram matches the first datagram signature;
determining, by the second network device, that datagrams that match the first datagram signature are to be sent to the first network device via the first member link of the plurality of member links; and
sending, by the second network device to the first network device, the second datagram via the first member link.

4. The method of claim 1 wherein determining, by the first network device, that the first datagram matches the first datagram signature comprises:
accessing the first datagram signature to extract from the first datagram signature a plurality of identifiers of a corresponding plurality of fields of a datagram and corresponding values for the plurality of fields;
extracting values from the plurality of fields of the first datagram; and
determining that the values from the plurality of fields of the first datagram match the values identified in the first datagram signature.

5. The method of claim 4 wherein the plurality of fields include one or more of a port identifier field and a traffic identifier field.

6. The method of claim 1 wherein determining, by the first network device, that the first datagram matches the first datagram signature comprises:
determining that values of fields in the first datagram match values identified in the first datagram signature.

7. The method of claim 1 further comprising:
prior to receiving the first datagram, receiving, by the first network device, information that identifies the first datagram signature, the information identifying a plurality of fields of a datagram and corresponding values for the plurality of fields;
generating, by the first network device, the first datagram signature based on the information;
storing, by the first network device, the first datagram signature in a data structure; and
sending, by the first network device to the second network device, the first datagram signature.

8. The method of claim 7 further comprising:
prior to receiving the first datagram, receiving, by the first network device, member link prioritization information that corresponds to the first datagram signature, the member link prioritization information identifying a priority of member links over which datagrams that match the first datagram signature are to be sent;
storing the member link prioritization information with information that correlates the member link prioritization information with the first datagram signature; and
sending, by the first network device to the second network device, the member link prioritization information.

9. The method of claim 1 further comprising:
receiving, by the first network device, a request to delete the first datagram signature;
deleting, by the first network device, the first datagram signature; and
sending, by the first network device to the second network device, a request to delete the first datagram signature.

10. The method of claim 1 further comprising:
receiving, by the first network device from the first device, a second datagram that matches the first datagram signature;
determining, by the first network device, that the second datagram matches the first datagram signature;
determining, by the first network device, that datagrams that match the first datagram signature are to be sent via the first member link of the plurality of member links;
determining, by the first network device, that the first member link is not responding;
accessing, by the first network device, member link prioritization information that corresponds to the first datagram signature, the member link prioritization information identifying the first member link as a highest priority member link and a second member link as a next highest priority member link;
determining, by the first network device, that the second member link is operable; and
sending, by the first network device to the second network device, the second datagram via the second member link.

11. The method of claim 1 wherein determining that datagrams that match the first datagram signature are to be sent to the second network device via the first member link of the plurality of member links comprises:
accessing, by the first network device, member link prioritization information that corresponds to the first datagram signature, the member link prioritization information identifying the first member link as a highest priority member link and a second member link as a next highest priority member link;
determining, by the first network device, that the first member link is operable; and
sending, by the first network device to the second network device, the first datagram via the first member link.

12. The method of claim 1 wherein the first member link is implemented via a first physical cable having a first length and a second member link of the plurality of member links is implemented via a second physical cable having a second length that is different from the first length.

13. The method of claim 1 wherein the first datagram signature is one of a plurality of datagram signatures.

14. The method of claim 1 wherein the first network device comprises one of a layer 2 switch, a layer 3 router, a layer 2.5 MPLS switch, and a layer 7 firewall.

15. The method of claim 1 wherein the first datagram comprises one of a layer 2 Ethernet frame and a layer 3 IP packet.

16. The method of claim 1 wherein each member link of the plurality of member links has a same data transfer rate.

17. A network device, comprising:
a memory; and
a processor device coupled to the memory configured to:
- implement a link aggregation group with a second network device, wherein the link aggregation group comprises a plurality of member links coupled to both the first network device and the second network device, each member link comprising a separate communications medium and being connected to a particular physical port of a plurality of physical ports of the first network device and a particular physical port of a plurality of physical ports of the second network device;
- receive a first datagram originating from a first device and destined for a second device that is communicatively coupled to the second network device;
- determine that the first datagram matches a first datagram signature;
- determine that datagrams that match the first datagram signature are to be sent to the second network device via a first member link of the plurality of member links; and
- send, to the second network device, the first datagram via the first member link.

18. The network device of claim 17 wherein the processor device is further configured to:
- receive a second datagram;
- compare the second datagram to a plurality of datagram signatures including the first datagram signature;
- determine that the second datagram does not match any datagram signature of the plurality of datagram signatures;
- select, using a hashing algorithm, a particular member link of the plurality of member links; and
- send, to the second network device, the second datagram via the particular member link.

19. A non-transitory computer-readable storage medium that includes executable instructions to cause a processor device of a first network device to:
- implement a link aggregation group with a second network device, wherein the link aggregation group comprises a plurality of member links coupled to both the first network device and the second network device, each member link comprising a separate communications medium and being connected to a particular physical port of a plurality of physical ports of the first network device and a particular physical port of a plurality of physical ports of the second network device;
- receive a first datagram originating from a first device and destined for a second device that is communicatively coupled to the second network device;
- determine that the first datagram matches a first datagram signature;
- determine that datagrams that match the first datagram signature are to be sent to the second network device via a first member link of the plurality of member links; and
- send, to the second network device, the first datagram via the first member link.

20. The non-transitory computer-readable storage medium of claim 19 wherein the instructions further cause the processor device to:
- receive a second datagram;
- compare the second datagram to a plurality of datagram signatures including the first datagram signature;
- determine that the second datagram does not match any datagram signature of the plurality of datagram signatures;
- select, using a hashing algorithm, a particular member link of the plurality of member links; and
- send, to the second network device, the second datagram via the particular member link.

* * * * *